(12) United States Patent
Lull et al.

(10) Patent No.: US 9,417,144 B2
(45) Date of Patent: Aug. 16, 2016

(54) APPARATUS, SYSTEM AND METHOD FOR POWER MEASUREMENT

(75) Inventors: Andrew P. Lull, Boulder, CO (US); Eric Golesh, Arvada, CO (US)

(73) Assignee: Foundation Fitness, LLC, Portland, OR (US)

( * ) Notice: Subject to any disclaimer, the term of this patent is extended or adjusted under 35 U.S.C. 154(b) by 545 days.

(21) Appl. No.: 13/356,487

(22) Filed: Jan. 23, 2012

(65) Prior Publication Data

US 2012/0214646 A1 Aug. 23, 2012

Related U.S. Application Data

(60) Provisional application No. 61/435,207, filed on Jan. 21, 2011.

(51) Int. Cl.
*G01L 1/04* (2006.01)
*B62M 3/00* (2006.01)
*A63B 21/005* (2006.01)
*A63B 71/00* (2006.01)
*G01L 3/24* (2006.01)
*A63B 24/00* (2006.01)

(52) U.S. Cl.
CPC .............. *G01L 3/242* (2013.01); *A63B 24/0087* (2013.01); *A63B 2220/54* (2013.01); *A63B 2220/833* (2013.01); *A63B 2225/50* (2013.01)

(58) Field of Classification Search
USPC ............ 482/5; 702/44; 73/362.621; 74/594.1
See application file for complete search history.

(56) References Cited

U.S. PATENT DOCUMENTS

| 5,027,303 | A | * | 6/1991 | Witte ..................... A61B 5/222 482/8 |
| 5,591,908 | A | | 1/1997 | Reid |
| 5,767,404 | A | | 6/1998 | Kaiser et al. |
| 6,356,848 | B1 | | 3/2002 | Cote et al. |
| 6,418,797 | B1 | * | 7/2002 | Ambrosina et al. ....... 73/862.29 |
| 6,684,713 | B2 | | 2/2004 | Nissila |
| 7,408,447 | B2 | | 8/2008 | Watson |

(Continued)

FOREIGN PATENT DOCUMENTS

| DE | 9415162 U1 * | 11/1994 | ............... A61B 5/22 |
| DE | 10007841 A1 * | 9/2001 | ............. A61B 5/224 |
| EP | 0386005 B1 | 1/1989 | |

OTHER PUBLICATIONS

Author: James Huang, Title: "Eurobike 2010: Look and Polar launch Kep Power pedal", Date posted: Sep. 9, 2010 according to Waybackmachine, Publisher URL:http://www.bikeradar.com/news/article/eurobike-2010-look-and-polar-launch-keo-power-pedal-27618/, pp. 3.*

*Primary Examiner* — Oren Ginsberg
*Assistant Examiner* — Shila Jalalzadeh Abyan
(74) *Attorney, Agent, or Firm* — Polsinelli, PC

(57) ABSTRACT

A power measurement device, which may be mounted to an inside area of a crank arm, includes processing circuitry within a housing. The processing circuitry is coupled with strain gauges mounted on the crank arm, and produces a power value that is wireless transmitted to a separate display that may receive and display power measurements. The housing may include a mounted portion and a cantilever portion where the mounted portion houses the processing circuitry and the cantilever portion houses batteries supply energy for the processing circuitry and other features.

24 Claims, 16 Drawing Sheets

(56) References Cited

U.S. PATENT DOCUMENTS

| | | |
|---|---|---|
| 7,585,258 B2 | 9/2009 | Watson et al. |
| 7,749,117 B2 | 7/2010 | Vergara |
| 7,775,128 B2 | 8/2010 | Roessingh et al. |
| 7,792,648 B2 | 9/2010 | Kalliomaki et al. |
| 7,806,006 B2 | 10/2010 | Phillips et al. |
| 7,975,561 B1 | 7/2011 | Ambrosina et al. |
| 8,006,574 B2 | 8/2011 | Meyer |
| 8,011,242 B2 | 9/2011 | O'Neill et al. |
| 2005/0132820 A1 | 6/2005 | Eilersen |
| 2006/0037409 A1 | 2/2006 | Ichige |
| 2006/0079382 A1 | 4/2006 | Lassanske et al. |
| 2007/0137307 A1 | 6/2007 | Gruben et al. |
| 2008/0236293 A1* | 10/2008 | Meggiolan .............. G01L 3/108 73/794 |
| 2008/0314193 A1 | 12/2008 | Meggiolan |
| 2009/0119032 A1* | 5/2009 | Meyer ..................... G01L 3/242 702/44 |
| 2009/0120208 A1 | 5/2009 | Meyer |
| 2010/0024590 A1 | 2/2010 | O'Neill et al. |
| 2010/0093494 A1 | 4/2010 | Smith |
| 2010/0263468 A1* | 10/2010 | Fisher ..................... G01L 5/225 74/469 |
| 2010/0280766 A1 | 11/2010 | Roessingh et al. |
| 2011/0040500 A1 | 2/2011 | Zhu et al. |
| 2011/0041626 A1 | 2/2011 | Tuulari et al. |
| 2011/0058360 A1* | 3/2011 | Taiga .......................... 362/158 |

* cited by examiner

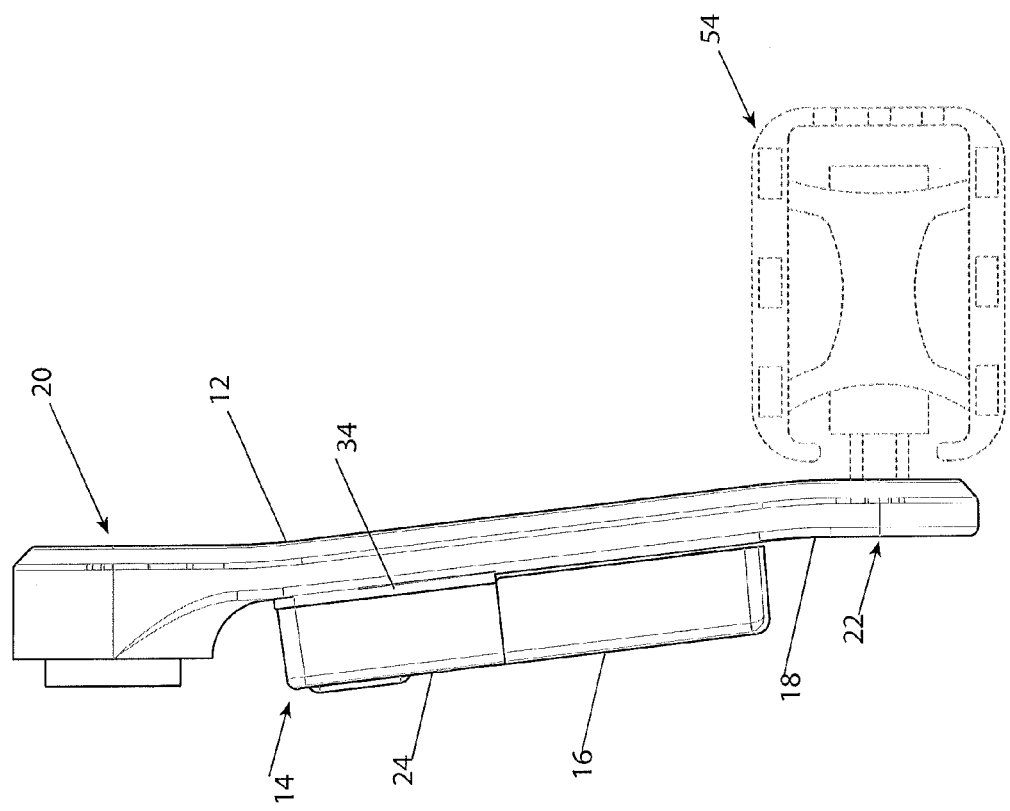

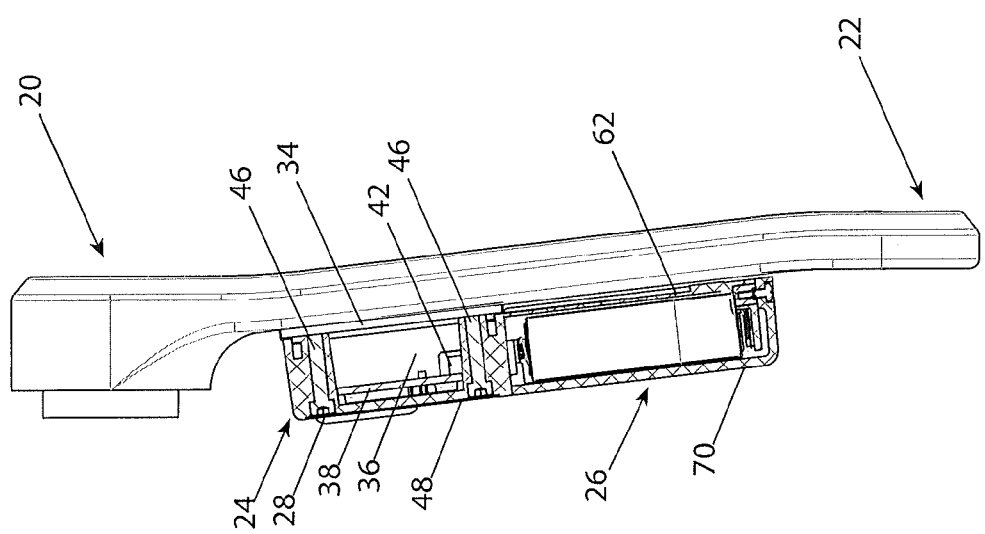

APPARATUS, SYSTEM AND METHOD FOR POWER MEASUREMENT

CROSS-REFERENCE TO RELATED APPLICATION

The present application is a non-provisional application claiming priority under 35 U.S.C. §119(e) to provisional application No. 61/435,207 titled "Apparatus, system and method for Power Measurement," filed on Jan. 21, 2011, which is hereby incorporated by reference herein.

TECHNICAL FIELD

Aspects of the present disclosure involve a power measurement device and methods for calculating power for use with a crank of a bicycle, exercise bicycle or other exercise and fitness equipment.

BACKGROUND

Fitness training using a power meter, particularly for bicyclists, is increasing popular. Power meters measure and display the rider's power output, typically displayed in Watts, used for pedaling. Power meters of many different sorts have been adapted for use on bicycles, exercise bicycles and other fitness equipment. Many of these designs are overly complicated, prone to error, and/or prone to failure, and also tend to be relatively expensive. As such, many health clubs have yet to add power meters to their indoor cycling and exercise bikes, and many riders find the expense of adding power to their road or mountain bike prohibitive.

Often, rather than power meters, such clubs and riders use heart rate monitors for training and to provide feedback for a rider. These devices also may provide information concerning speed, distance traveled, and calories, but that information cannot include or be based upon power measurements and thus may not be as accurate as values derived form or taking into account power. Measuring heart rate, however, while providing useful information for measuring performance, is not as good as measuring power in providing consistent and useful information to the rider. For example, when rapidly accelerating or sprinting, heart rate lags behind the rider's effort whereas power provides a nearly instantaneous reflection of the rider's effort. When a rider is dehydrated, malnourished, tired, sick, injured, or otherwise not in optimal riding condition, the rider may conduct a workout at a typical heart rate but their power at that heart rate may be considerably less than typical. Thus, the rider can identify and possibly rectify the cause of the non-optimal condition. Finally, measuring and comparing power over an extended period of training, can help a rider identify training that helps increase power and those that do not and thereby continually refine and improve their training regimen.

With these thoughts in mind among others, aspects of the power meter and related power measurement techniques of the present disclosure were conceived.

SUMMARY

One aspect of the present disclosure involves a power measurement assembly comprising a crank arm including at least two strain gauges. The power measurement assembly further includes a housing mounted on the crank arm and including a circuit connected to the at least two strain gauges and configured to provide an output to a processor proportional to a force applied to the crank. The processor is further configured to calculate a power value and the housing further includes a wireless transmitter configured to receive the power value and transmit information representative of the power value.

Another aspect of the present disclosure involves a power measurement assembly comprising a crank arm defining a pedal aperture and a bottom bracket aperture. The crank arm has two or more strain gauges configured to react in response to a force applied to the crank arm. The strain gauges are arranged in parallel and each of the strain gauges are positioned, such as through an adhesive, on a common wall of the crank arm. A housing is mounted on the crank arm and the housing includes an element, such as a reed switch or an accelerometer, providing an output corresponding to revolutions of the crank arm. The housing further includes a circuit including the strain gauges where the circuit is configured to provide an output to a processor as a function of the force applied to the crank and the processor is configured to calculate a power value. The housing may further include a wireless transmitter configured to transmit information representative of the power value.

Another aspect of the present disclosure involves an exercise bicycle comprising a power measurement assembly including a crank arm defining a pedal aperture, a bottom bracket aperture, and a longitudinal centerline extending between the pedal aperture and the bottom bracket aperture. The crank arm further includes a recess, which may be a machined recess, positioned relatively closer to the bottom bracket aperture than the pedal aperture. The recess is positioned on an inside wall of the crank arm and includes four strain gauges disposed within the recess. Two of the four strain gauges are disposed on the crank arm on one side and substantially equidistant from the longitudinal centerline and two of the four strain gauges disposed on an opposing side and substantially equidistant from the longitudinal centerline. The strain gauges are each positioned with the same relative orientation and substantially parallel such that the two gauges on one side of the longitudinal centerline will be in compression while the two gauges on the opposing side of the longitudinal centerline will be in tension when a force is applied at the pedal aperture. The power measurement assembly further includes a housing mounted to the recess of the crank arm. The housing includes a circuit board with a reed switch configured to provide a pulse during rotation of the crank arm and further including a Wheatstone bridge circuit including at least the four strain gauges. The Wheatstone bridge circuit is configured to provide an output to a processor proportional to a force applied to the crank. The processor is configured to calculate a power value. The circuit board further includes a wireless transmitter configured to receive the power value and transmit information representative of the power value. Finally, the housing includes a cantilevered portion extending from the recess along the longitudinal centerline toward the pedal aperture where the cantilever portion is disposed above but not in contact with the crank arm and houses at least one battery to provide power to the circuit board.

Finally, another aspect of the present disclosure involves an exercise device crank arm with a power measurement assembly, comprising a crank arm including a pedal aperture, the crank arm further including at least one unmodified sidewall. The unmodified sidewall is as produced by a crank arm manufacturer. The crank arm further includes a set of strain gauges adhered to the at least one unmodified sidewall, such as through an adhesive or even tape but not through a mechanical device such as a screw. The set of strain gauges includes a plurality of strain of gauges each arranged parallel to the others. The crank arm further includes a power assembly housing adhered to the at least one unmodified sidewall, the power assembly housing defining at least one cavity surrounding the strain gauges. The strain gauges include leads connecting the strain gauges in a circuit configuration producing an output to a processor also within the housing, the power assembly configured to wirelessly transmit a power value.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 4A is a top view of the crank arm and power measurement apparatus shown in FIG. 1;

FIG. 4B is a top view of the crank arm and power measurement apparatus shown in FIG. 1, with some components of the power measurement apparatus hidden to illustrate internal components;

DETAILED DESCRIPTION

Figure 1:
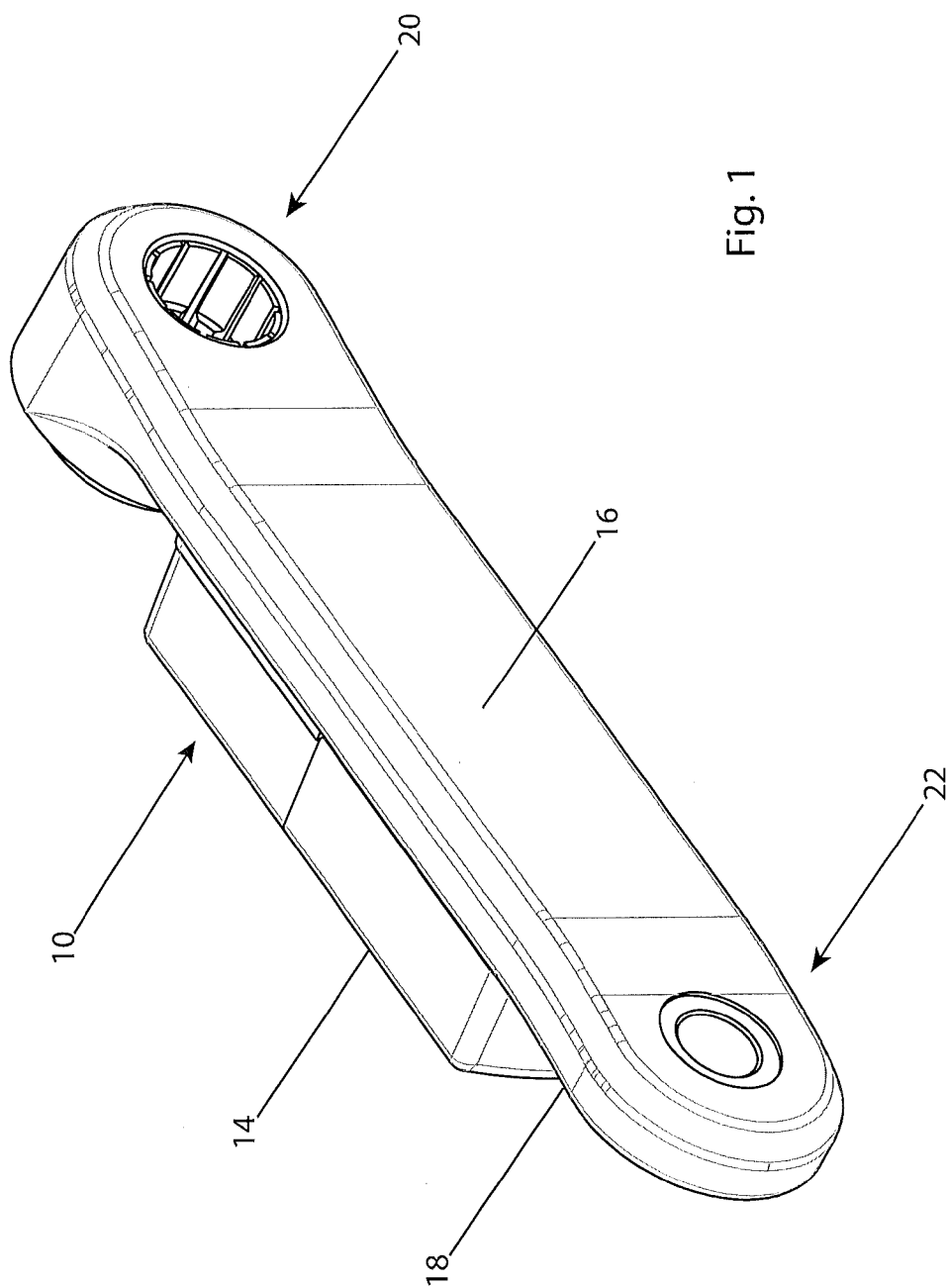
FIG. 1 is an isometric view of a crank arm with a power measurement apparatus connected thereto.
Figure 2:
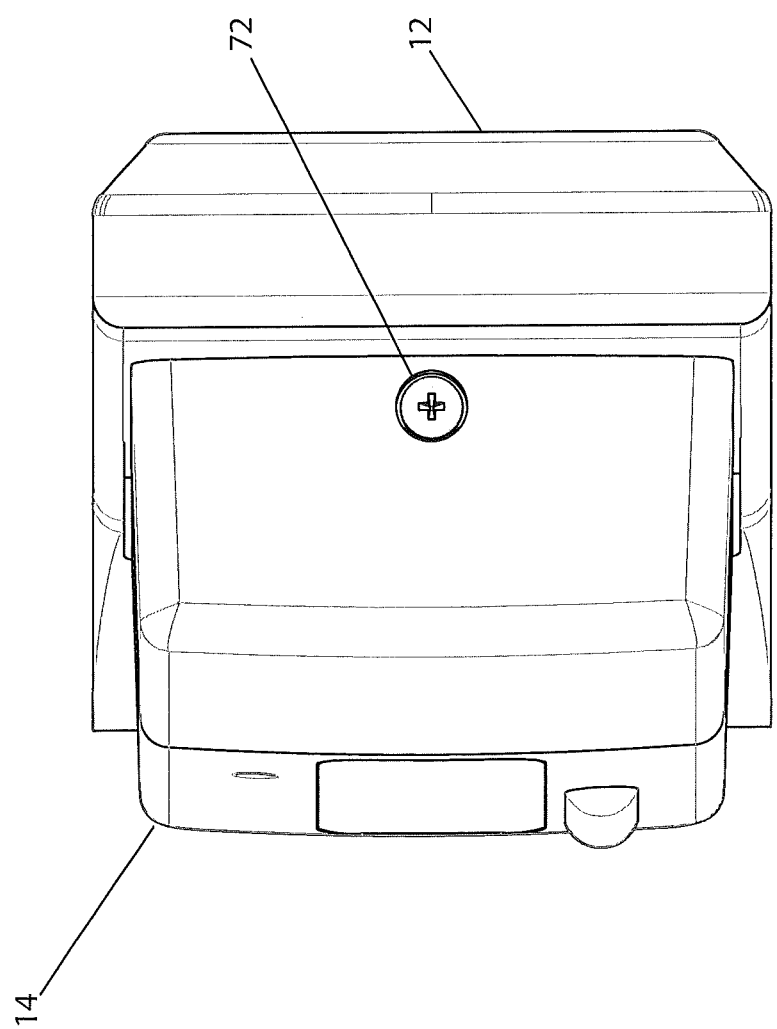
FIG. 2 is a front view of the crank arm and power measurement apparatus shown in FIG. 1.
Figure 3:
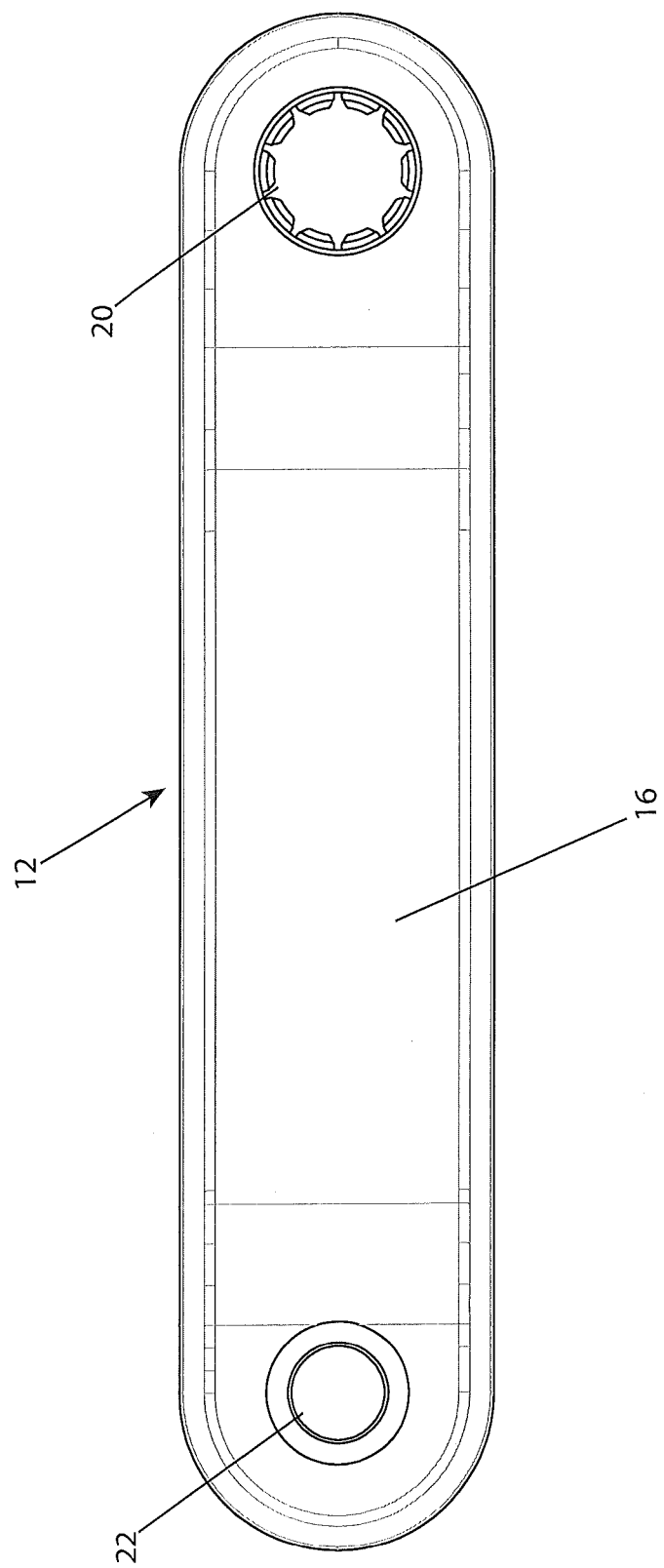
FIG. 3 is a left side view of the crank arm shown in FIG. 1, and particularly showing the outside of the crank arm from which a pedal would extend.
Figure 5A:
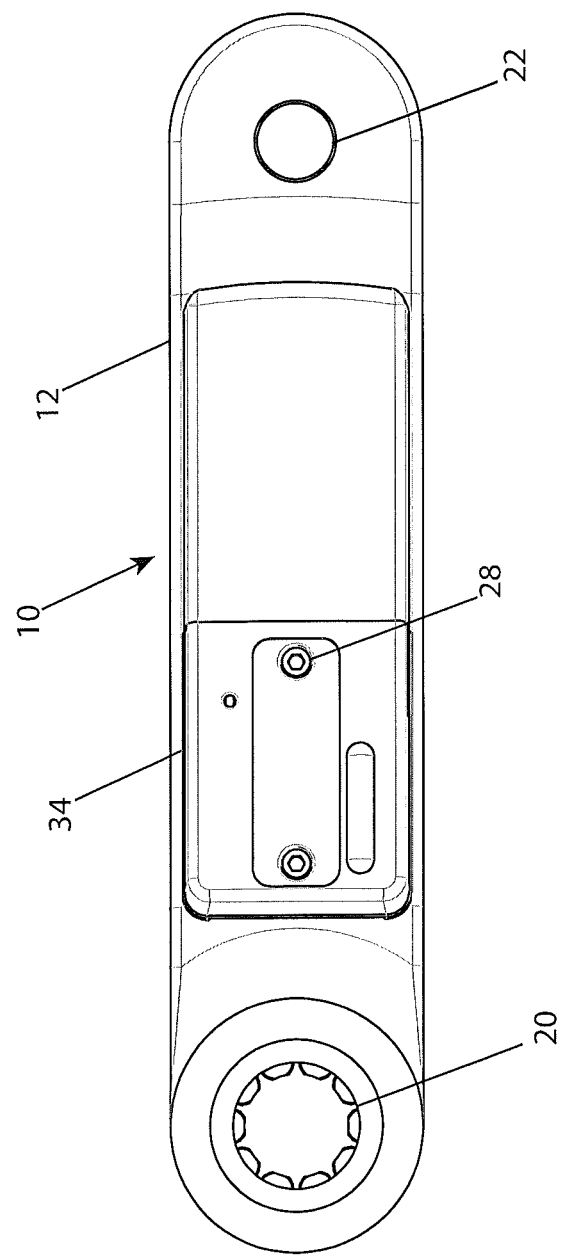
FIG. 5A is a right side view of the crank arm and power measurement apparatus shown in FIG. 1, and particularly illustrated the inside of the crank arm to which the power measurement apparatus is connected.
Figure 5B:
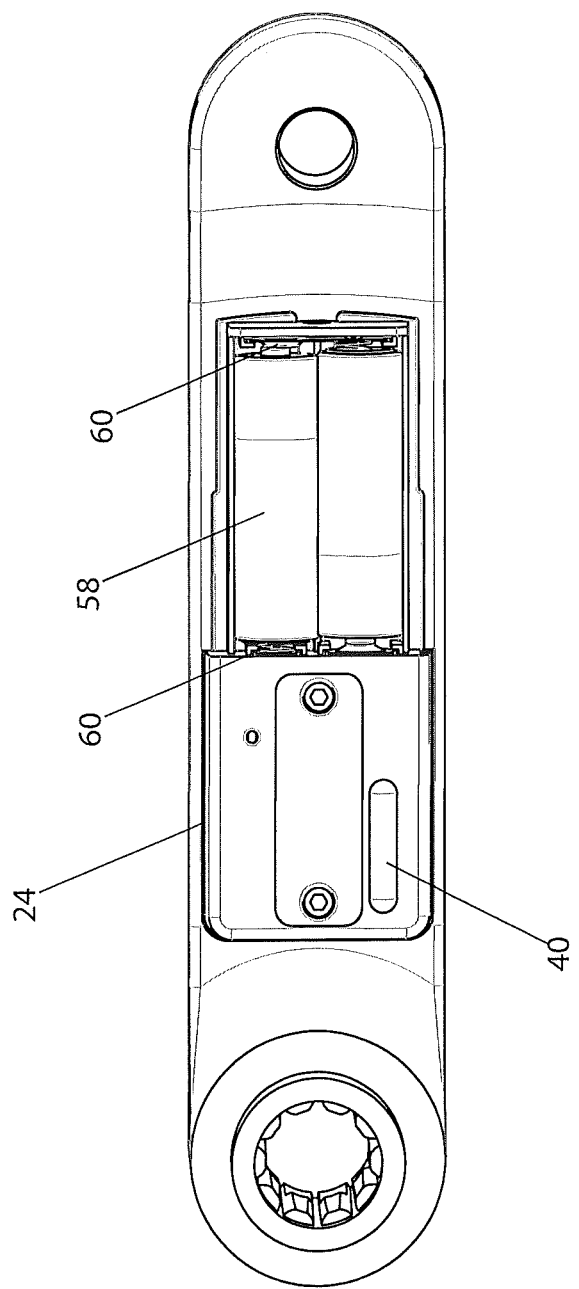
FIG. 5B is a right side view of the crank arm and power measurement apparatus shown in FIG. 1, and particularly illustrated the inside of the crank arm to which the power measurement apparatus is connected, with some components of the power measurement apparatus hidden to illustrate internal components.

Aspects of the present disclosure involve a power measurement assembly mounted on a crank arm of an exercise bicycle, indoor cycling bicycle, bicycle, or other form of mobile device or exercise equipment. In one particular implementation, each of the components that measure power, calculate power, and transmit the power calculation to a display are mounted on a crank arm. In one particular implementation, the display wirelessly receives power data and displays a power value, the display may be mounted anywhere desirable, such as on a handlebar, the display may be incorporated in a wrist watch, or the power data may be transmitted to other devices, such as a smart phone, for a real-time display and/or storage. Existing equipment that includes a crank may be easily retrofitted with a crank arm that wirelessly transmits a power measurement.

In the example implementation shown herein, a power measurement device 10 is mounted on a crank arm 12. The crank arm 12 shown is particularly suited for an indoor cycling (IC) bicycle; however, the crank arm may be used on other forms of exercise bicycles, whether upright, recumbent, or otherwise, may be used with bicycles, may be used with other forms of fitness equipment that employ a crank arm, such as elliptical trainers, stair climbing machines, and the like, and may be used with any device that includes a crank arm and where power measurement or the components of power measurement (e.g. torque, force, RPM) may be desired or otherwise beneficial. Suitable indoor cycling bicycling bicycles that may include a crank arm with the described power measurement device are illustrated in U.S. patent application Ser. Nos. 13/267,479 and 13/267,719 titled "Exercise Bicycle with Bicycle Seat and Handlebar Adjustment Assemblies" and "Exercise Bicycle with Magnetic Flywheel Brake" respectively, and which are both hereby incorporated by reference herein.

Referring to the various drawings and particularly FIGS. 1, 2, 4A, 4B, 5A, 5B, 6 and 10, the power measurement device 10 includes a housing 14 secured to an inside portion 18 of the crank arm between a bottom bracket aperture 10 and a pedal aperture 22. Various power measurement electronics are provided within the housing. The inside portion 18 of the crank arm, where the housing 14 is mounted, is that portion adjacent or facing the bicycle frame, drive sprocket, etc. In various possible other implementations, the housing 14 may also be secured to other portions of the crank arm, such as the top, bottom or outside portion. However, securing the housing to the inside portion of the crank arm shields the housing and attendant power measurement components from inadvertent contact with a rider or other obstacle. For example, if a rider's foot were to slip off the pedal, the foot could contact the housing if it was secured to some other portion of the crank arm. However, on the inside of the crank arm, the rider's foot would not contact the housing.

Referring now to FIG. 4A, the housing 14 includes a mounted portion 24 and a cantilever portion 26. The mounted portion 24 is secured, such as through a pair of bolts 28, to a machined recess 30 in the crank arm. It is also possible to attach the housing 14 to the crank using tape, adhesive or other mechanisms. As discussed further below, one or more strain gauges are mounted to the crank arm within the machined recess 30. The mounted portion 24 defines a male portion with a circumferential flange 32 such that the male portion is dimensioned to fit snugly within the machined recess. A gasket 34 may be provided in a circumferential channel defined in the mounted portion adjacent the crank. When assembled, the gasket is sandwiched between the mounted portion of the housing and the crank arm to block moisture, such as sweat from a rider and water or mud from a trail or road, from entering into the recessed area or into the housing.

The mounted portion further defines a cavity 36 within which are provided a circuit board 38, reed switch 40 (attached to the circuit board) and a port 42 by which electrical components on the circuit board may be accessed or otherwise communicated with to download software or firmware updates as well as to access information. Thus, besides the strain gauge and electrical connections thereto, the various electrical components that process the strain gauge outputs and transmit the data are located within the cavity of the housing. In one particular arrangement, a pair of bolts 28 extend through the mounted housing and are secured to matching threaded apertures 44 defined in the recessed portion of the crank. The printed circuit 38 board extends between and is connected to a pair of molded cylinders 46 through which the bolts 28 pass. The molded cylinders 46 form an integral part of the mounted portion 24 of the housing and extend between an outer wall 48 of the mounted portion and the recess in the crank arm. The cylinders may be dimensioned so that it engages the crank and prevents the housing from being cracked while tightening the bolts.

The power assembly discussed herein may also be adhered, non-mechanically fastened, to any form of existing crank arm without modifying the crank. In such an example, the power assembly housing may or may not include a cantilever portion and will not include a male portion configured to engage a recess. Strain gauges may be adhered directly to a particular crank wall, without physical modification of the side wall. Some surface preparation (cleaning, etc.) may be required before adhering the strain gauges to the crank wall, however. A lower surface of the power assembly housing will define an opening suitable to cover the strain gauges and receive leads connected to the strain gauges. Given the vast number of possible crank arms to which the assembly might be adhered, it is possible that the lower surface and/or wall engaging the crank arm surface, may be contoured to match the crank arm wall contour of a given crank arm. Alternatively, a plurality of different adapters may be fabricated so that a common power assembly housing may mate to different crank arms. In such a configuration, and adapter may have a first side that has a matching contour of a given crank arm, and a second side that has a matching contour of the common power assembly housing. The housing in any given configuration includes the processor, batteries, and wireless transmission capability. Accordingly, the system may be mated to any of a variety of existing crank arms without modification of the crank arm (e.g., without tapping the crank arm to accepts bolts which could effect the structural integrity of the crank), and the power assembly will wireless transmit a power value that may be used to display the power being exerted while riding and/or exercising on a device including the crank. With such a system, there is no need to purchase or replace existing drive train components. Rather, a rider may simply retrofit or purchase a crank arm (with power assembly) for his or her existing drive train.

Figure 6:
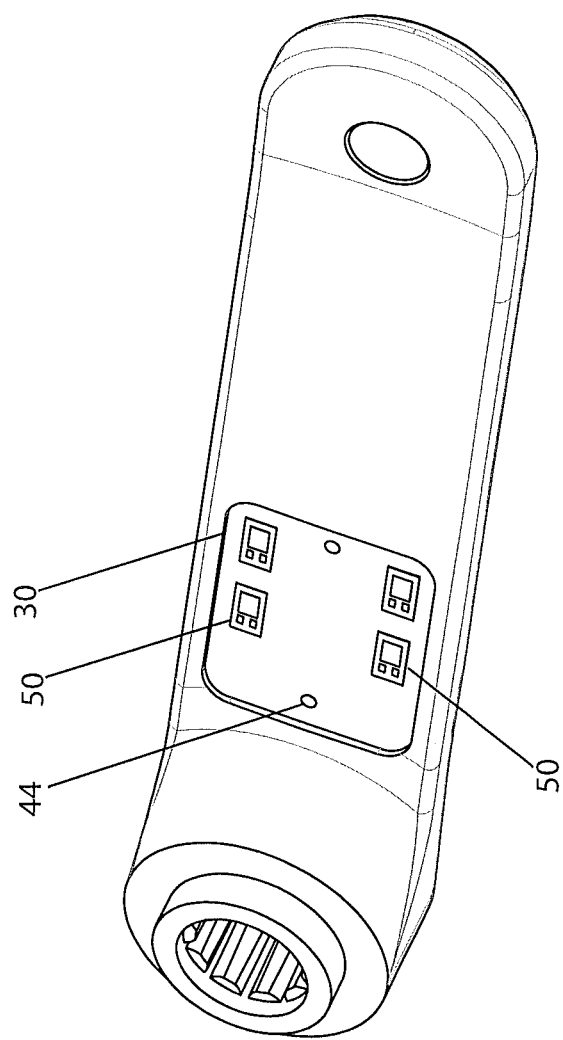
FIG. 6 is an isometric view of the inside of the crank arm particularly illustrating a recess, which may be machined or directly molded into the crank arm, within which are four resistive reed switches that provide a fluctuation in resistance proportional to the force applied on a pedal connected to the crank.
Figure 7:
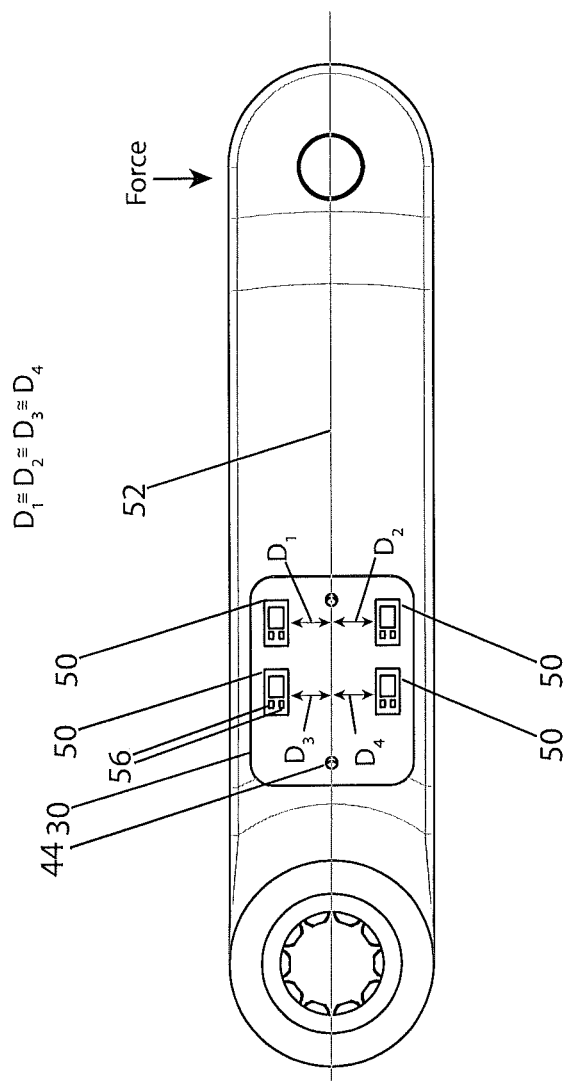
FIG. 7 is a right side view of the crank arm as shown in FIG. 6 and providing further detail as to the arrangement of the strain gauges within the recess of the crank arm.
Figure 8:
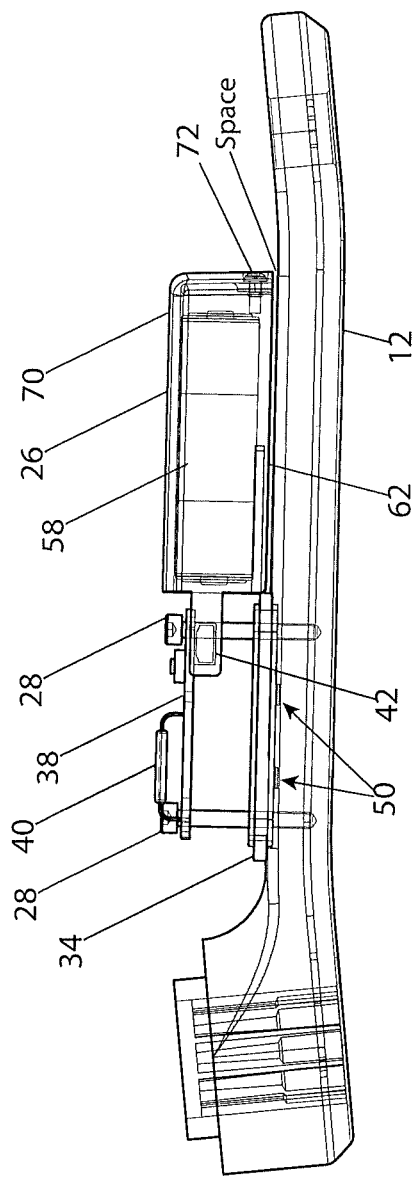
FIG. 8 is a top view of the crank arm and power measurement device with various components hidden to illustrate internal components.
Figure 9:
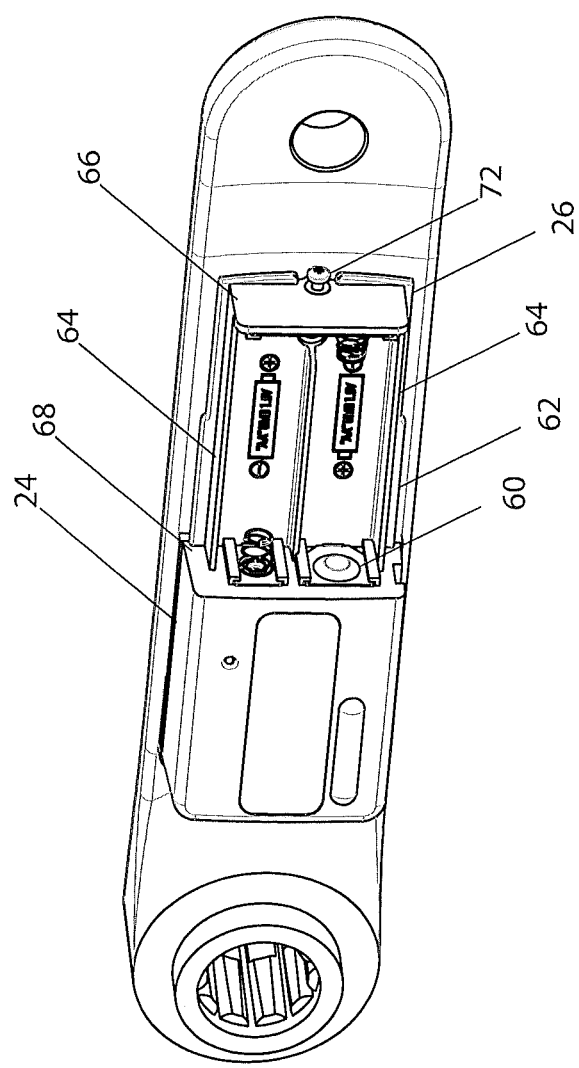
FIG. 9 is an isometric view of the crank arm and power measurement apparatus with the cover of the cantilevered portion of the housing removed.
Figure 10:
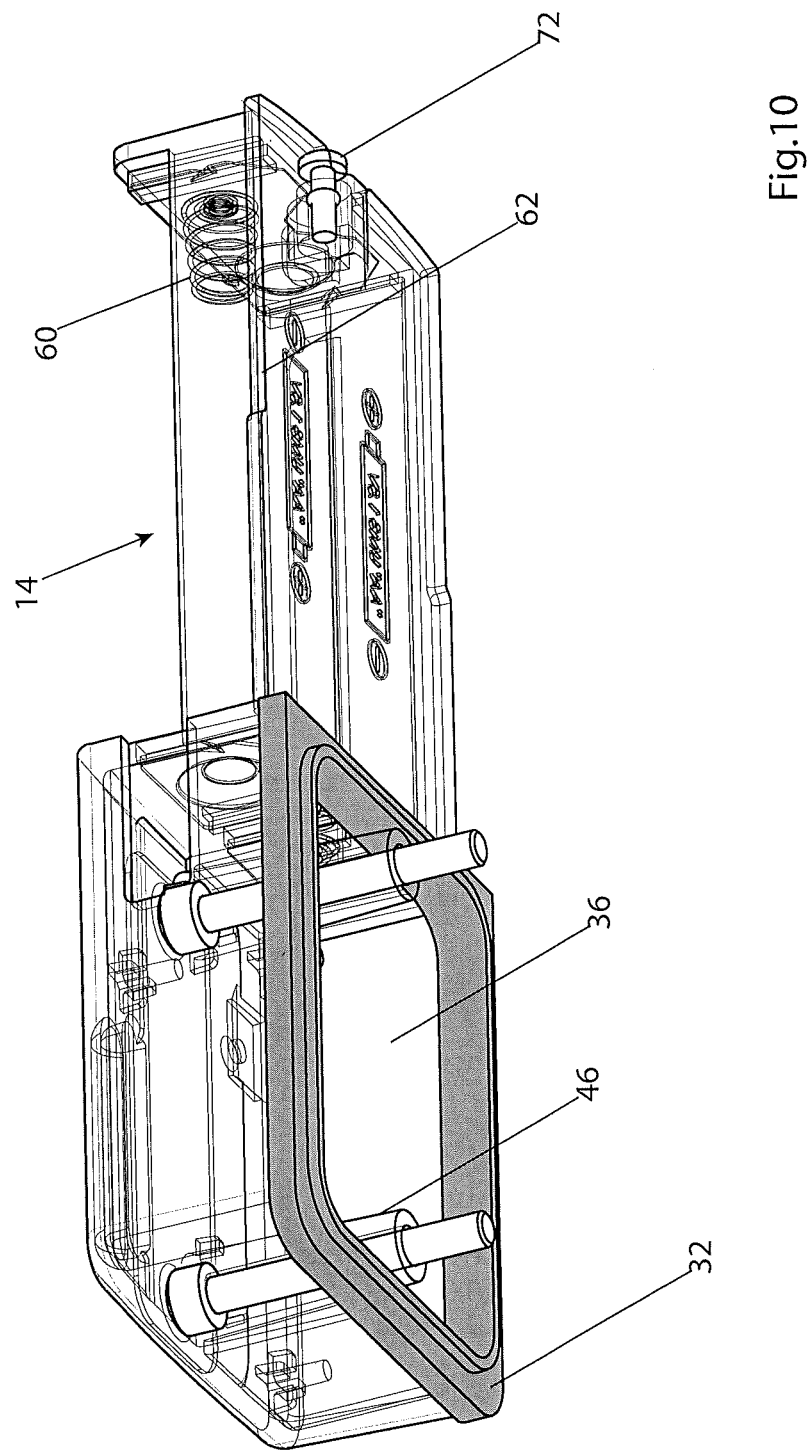
FIG. 10 is an isometric view of the power measurement apparatus with various components hidden.

As shown in FIGS. 6, 7, 8 and others, within the recessed portion 30 of the crank arm, one or more strain gauges 50 may be provided. In the implementation shown, two pair of strain gauges are shown with one member of each pair disposed equidistant from a centerline 52 of the crank arm to an opposing pair. The strain gauges are placed on the inside wall of the crank arm. In one particular implementation, the strain gauges are glued to a smooth flat surface of the crank. While a machined or otherwise provided recess is shown, the power measurement apparatus may be applied to an existing crank arm with little or no preprocessing of the crank arm. The machined recess 30 shown is provided with a smooth flat bottom upon which the strain gauges are secured. To assist with consistency between crank assemblies, a template may be used to apply the strain gauges to the crank surface within the machined recess. Alternatively, the strain gauge may be pre-mounted on a substrate in a desired configuration, and the substrate mounted to the crank. The side walls of the machined recess also provide a convenient way to locate the housing.

In the implementation shown, the strain gauges 50 are placed relatively closer to where the crank is mounted at the bottom bracket 45 compared to where torque is applied to the crank arm at the pedal 54. As such, with the strain gauges 50 placed relatively closer to the pivot point of the crank arm (i.e., the bending point of the theoretical beam), there is greater strain gauge output resolution providing a larger output voltage of the Wheatstone bridge circuit, discussed herein, compared to having the strain gauges been placed relatively closer to the pedal point given the same torque. With greater resolution, the output voltage is large relative to noise and other spurious voltage outputs therefore, the circuit requires relatively less filtering, amplification and the like to accurately extract the voltage reading of the circuit.

As shown, the strain gauges 50 may be placed on the same wall of the crank arm and are arranged in the same relative direction. In one particular example, the strain gauges are each parallel to the other gauges. Stated differently, each strain gauge defines a longitudinal axis across which the strain gauge is response to tension or compression. Each of the strain gauges is arranged such that the longitudinal axes are parallel. Hence, in the example of FIG. 7, with the illustrated downward force on the crank, the upper strain gauges (SG1 and SG2) will be in tension while the lower strain gauges (SG3 and SG4) will be placed in compression. The arrangement, through its geometry, filters out forces not relevant to measuring power applied to the cranks causing rotation about the bottom bracket. For example, should a transverse force (e.g. normal to plane defined by the 2 pair of gauges) be applied to the pedal, such as if a rider is applying a force that has both downward and non-downward forces on the pedal, then all of the strain gauges will compress or tension in the same way from the transverse force and cause a 0 voltage output of the Wheatstone bridge circuit. Similarly, non tangential forces applied to the pedal are automatically normalized to a tangential force measurement.

Additionally, the strain gauges are positioned on the same wall or surface of the crank arm. In the particular examples set out herein, the strain gauges are each on an inside wall of the crank arm. The inside wall is the wall facing an opposing crank or otherwise the frame of the exercise bicycle when the crank is assembled on the exercise bicycle. The assembly can be positioned on other walls, depending on the configuration. The inside wall, however, provides some protection of inadvertent contact. The inside wall (or opposite outside wall) experiences less deflection during riding as compared to the upper and lower walls (those walls or surfaces connecting the inside and outside walls). Placing the strain gauges on those upper and/or lower walls, would provide greater strain gauge bridge output for the same forces thereby providing potentially higher resolution bridge outputs. Nonetheless, those wall are potentially at risk for much greater inadvertent contact, whether on an indoor bike or outside bike.

Figure 11:
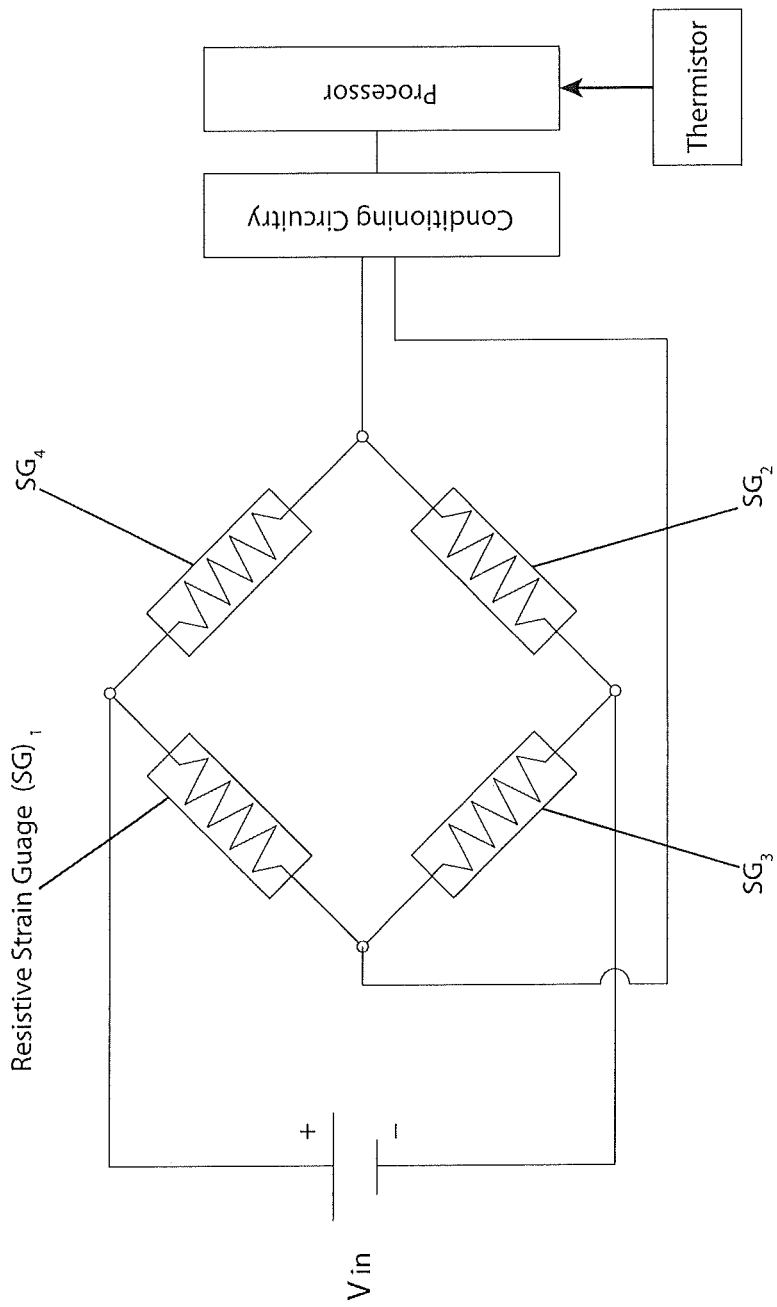
FIG. 11 is a circuit diagram of a Wheatstone bridge circuit and related processing components that may be used to provide a voltage output proportional to the force applied to the crank arm.

The strain gauges 50 each include leads 56 connected in a Wheatstone bridge circuit arrangement. For example, as shown in FIG. 11, the strain gauges are connected in the circuit arrangement shown. Other circuit arrangements are possible that use more or less strain gauges, such as a half bridge configuration. An input voltage is applied to the bridge circuit and the output voltage of the circuit is proportional to the tangential bending force (torque) applied to the crank arm. The output voltage may be applied to some form of conditioning and amplification circuitry, such as a differential amplifier and filter that will provide an output voltage to the processor. It is further possible to use an analog to digital converter to convert and condition the signal.

Figure 12A:
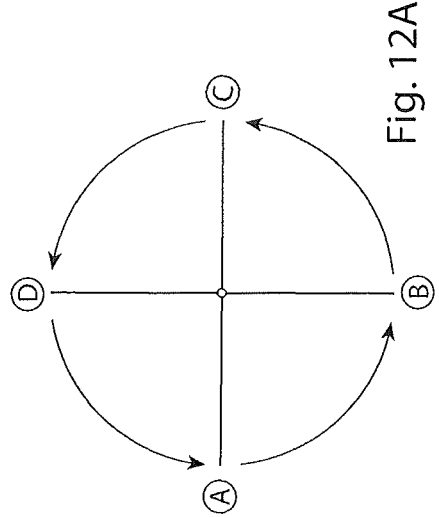
FIG. 12 is output voltage waveform of the Wheatstone bridge circuit of FIG. 11 for approximately one revolution a crank arm.
Figure 12B:
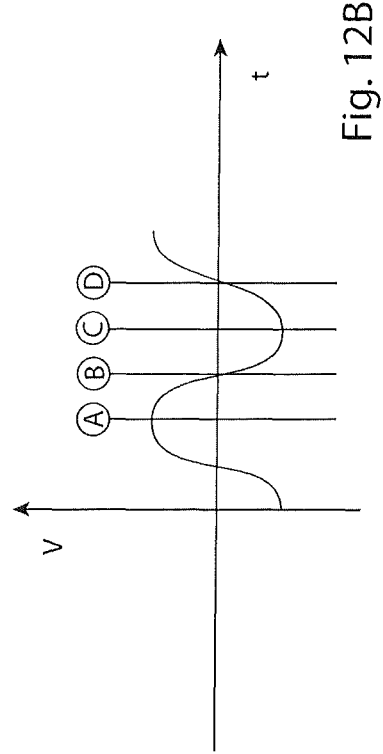
Figure 13:
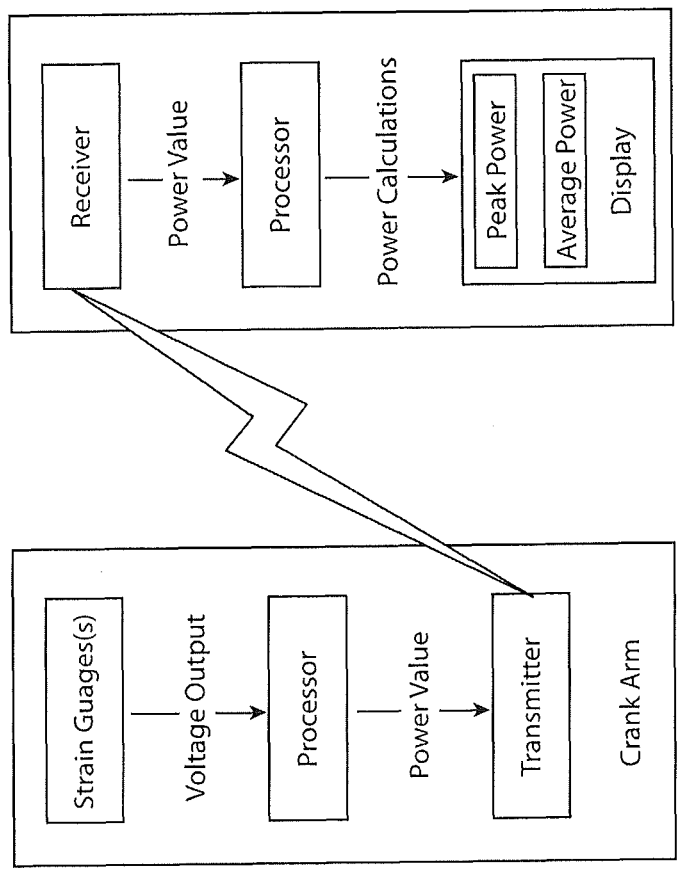
FIG. 13 is system diagram illustrating the electrical components positioned at the crank arm and within the power measurement housing in wireless communication with a display computer provided separately from the power measurement apparatus.

With the illustrated strain gauge configuration, the output voltage of the Wheatstone bridge circuit is proportional to the torque applied and also indicative of the direction of rotation and the crank position. As illustrated in FIGS. 12A and 12B, generally speaking, the output of the Wheatstone bridge will be a sinusoid with the highest output voltage with the crank approximately horizontal and a downward force applied to the crank arm (crank position A, FIG. 12B). As the crank moves through the downward vertical position (crank position B), the voltage will typically be about 0, as the crank moves upward to horizontal (crank position C) the voltage will be slightly negative. Typically the downward force of the opposing crank arm pushes the measured arm up against some weight of the rider's leg (typically riders do not pull upward on the cranks, the opposing leg hence uses some force to push the opposing crank arm upward against the opposing leg), and as the crank moves through the upward vertical position (crank position D) the output voltage will transition from a negative value to a positive value, and reach its peak output again as the crank is rotated through horizontal (crank position A).

In one possible implementation of the power measurement device 10, power measurement only occurs on one of two crank arms. In such an arrangement, relative symmetry between the right and left leg of a given rider is assumed and the average power calculated from the power measurement device on one crank is doubled and transmitted to the display processor. In one example, the power doubling occurs within the power measurement device, by the processor or otherwise, and the power value wirelessly transmitted by the device includes the doubling. With such an arrangement, the power measurement device may work with a proprietary display device or may work with third party devices that implicitly expect a value that accounts for both legs and has no inherent functionality to double a value. In some examples, the device may wireless transmit the single leg (crank) power value and doubling may occur at the display processor or related display electronics. Alternatively, the display may be configured to sum to power values wireless received, when separate power measurement devices are each mounted on opposing crank arms to provide distinct crank arm power measurements.

Regardless, the power calculations/measurements displayed are indicative of the total power output by a given rider. Measuring power of only one leg, while theoretically not as precise as separate devices for each leg, nonetheless has several advantages. First, retrofitting and maintaining the power measurement device is far less complicated and costly compared to a similar implementation with two devices. Secondly, when installed on training equipment, particularly in a gym environment where a given rider may not use the same equipment during successive trips to the gym, the device set out herein may be calibrated such that power measurements across machines is consistent. With such consistency, whether across machines or not, a given rider can measure overall relative riding differences. Of course, it is possible to apply a power measurement device to each crank arm of a given machine and provide individual crank arm power measurements as well as a summation of the power measurements. In such an implementation, a rider would be provided with data on each individual leg as well as a total power output indicative of overall power output.

A reed switch 40 is included in the power measurement device and a magnet (not shown) may be placed on the frame of whatever device the crank is attached to such that the reed switch closes as it passes the magnet. Thus, the time between two pulses of the reed switch indicate one complete revolution of the crank. Using a microprocessor clock, the pulses can be converted to a revolution per minute measurement.

Figure 14:
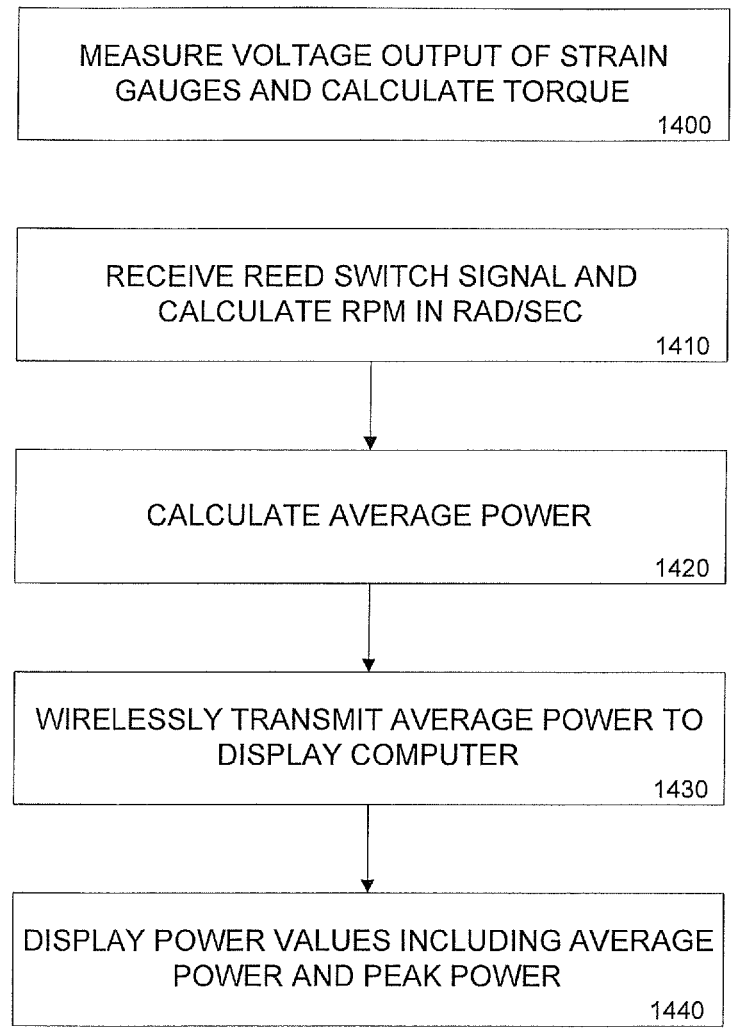
FIG. 14 is a flowchart illustrating one method of calculating and transmitting power measurements from the power measurement apparatus.

"Power" is the most common measurement of a rider's strength. Referring to FIG. 14, in one implementation, the instantaneous torque 15 measured by the strain gauges with the output voltage of the strain gauges being, is converted to a power value for display. First, the voltage output of the strain gauges is provided to the processor (operation 1400). The output of the circuit is a measure of torque and therefore is converted to power through obtaining a radians/sec value. As mentioned herein, the voltage output may first be converted to a digital value through an analog to digital converter. In on specific implementation, power (watts) is calculated as radians/sec multiplied by the torque value.

$$\text{Power (Watts)} = \text{Radians/Sec} \times \text{Torque}. \tag{1}$$

The reed switch and/or the accelerometer provide data indicative of each revolution of the crank arms. In conjunction with the processor clock, or otherwise, the processor obtains a revolutions per minute value in radians per second (operation 1410). With a reed switch, a pulse is receive at each revolution of the crank arm, and the pulse to converted to revolutions per minute through comparison with the processor clock. Then, to convert the RPM value to Radians/Sec, a multiplier value of 0.1047 is used, in one particular example.

$$\text{RPM} \times 0.1047 = \text{Rad/Sec}. \tag{2}$$

The strain gauge measurement, in conjunction with the revolution measurements, is converted to an instantaneous power value by as discussed above and multiplying that value by the length of the crank arm between the apertures (operation 1420).

$$\text{Torque (N*m)} = \text{Force (Newton)} \times \text{Length (meters)}. \tag{3}$$

Hence, with measured torque multiplied by the Rad/Sec value, power is calculated. In one example, power is sampled at 32 Hz, and converted and wirelessly transmitted (operation 1430) to the display using the ANT+ protocol developed by Dynastream Innovations, Inc. While the transmitter is shown as a discrete component within the housing, it is possible that it, along with other electrical components, might be provided in the processor. Further, the processor may be implemented as an ASIC, as computer executable instructions in a memory attached to the processor, as a customized circuit, etc. Moreover, other protocols and wireless transmission mechanism may be employed.

In one possible implementation, the average power is displayed (operation 1440) over a number of samples as opposed to an average across all samples. In this way, large changes in power associated with rapid acceleration, for example, may be captured but rapidly changing fluctuations between power measurements are filtered by the averaging. In one example, a rolling average of the most recent 64 measurements is displayed. Hence, the most recent 64 power measurements are summed and divided by 64 to display average power. Note, the power measurement device transmits instantaneous power measurements at 32 Hz and those measurements are doubled (to account for the opposing crank without a power measurement device). While this combination of transmission frequency and averaging is not necessary, it has been shown to be responsive to instantaneous changes associated with quick acceleration as well as providing a display that is not overly jittery if too few values are averaged. It is also possible to transmit torque values (or voltages) and RPM measurements, and then calculate power within the display counsel.

Returning again to the figures illustrating the housing 14 (e.g., FIGS. 1, 2, and 4) adjacent the mounted portion 26 is a cantilevered portion of the housing. The cantilevered portion 26 extends from the mounted portion 24 along the crank arm body toward the pedal aperture 22. The cantilevered portion 26 houses batteries 58 and connection points to provide power to the electrical components within the mounted portion of the housing. The cantilevered portion defines a substantially flat bottom adjacent, but not touching, the inside portion of the crank arm. Because the crank arm does bend during usage albeit only slightly, cantilevering a portion of the housing provides several advantages. Firstly, by not touching the crank arm, there will not be any squeaks caused by the crank arm moving relative to and rubbing against the cantilevered portion. Secondly, the cantilevered portion is not bolted to the crank arm. Had the cantilevered portion been bolted, the bending distance between the bolts on the mounted portion relative to a bolt on the cantilevered portion could potentially cause the housing to crack, to loosen the bolts, or to damage some internal components.

The cantilevered portion 26 includes a base portion 62 that extends from and is integral to the mounted portion. The base portion 62 includes opposing side walls 64 and a front wall 56 distal a midwall 68 of the mounted portion. Battery contact points 60 are provided at the front wall and the midwall and batteries are positioned therebetween. Wires are connected to the contact points and routed to the circuit board to provide power to the various components coupled thereto. A cover 70 is snap fit to the base portion and may further be secured by a small screw 72 engaging a threaded aperture in the front wall. The embodiment shown includes two AA batteries, which are well suited for a club environment for ease of exchange and long life. It is also possible to use smaller watch style (coin) batteries or other types of power supply.

In an alternative implementation, an accelerometer, which may be a two or three axis accelerometer, may be used alone or in conjunction with the reed switch. An accelerometer may be used to provide both crank position and rpm measurements. Namely, for example, in a two axis accelerometer or a three axis accelerator where two of the three axis are used, one axis may be aligned with the crank arm and the other axis oriented at 90 degrees to the crank arm. Accordingly, one axis will output a value commensurate with the g-force experienced by the crank and the other axis will output a value 90 degrees out of phase with the first. By knowing the axis associated with the crank and whether attached to the left or right crank, the accelerometer, will output a value that is a function of the crank position among other factors. Further by comparing the output of the other axis, it can be determined whether the cranks are being pedaled forward or backward.

In another alternative implementation, a thermistor is operably associated with the processor. Strain gauges, the crank material, and other components are affected by temperature. Accordingly, it is possible that when a power assembly is exposed to significant temperature variations, such as during a ride that commences early in the morning and continues as the outside temperature increases, the power output delivered by the device would vary based on temperature. In such situations, the device may output different power values due to temperature even when the rider is cranking at the same power. So, a rider cranking along at 150 watts in the early morning would have a power reading of 150 watts, and the same rider cranking along at 150 watts after it has warmed up outside may only have a power reading of 100 watts. The thermistor can be used to provide temperature compensation to the power value and thereby reduce or eliminate the temperature effect on the power calculation.

In one particular implementation, the Wheatstone bridge circuit provides its voltage output to an analog-to-digital converter to convert the voltage to a digital value. The thermistor also outputs its voltage to the analog-to-digital converter to convert the voltage to a digital value. These values are then input to the processor. Therefore, the processor receives a digital power value and a digital temperature value.

The processor, which is coupled with a memory and/or includes on-board memory, has a power curve and may also have a temperature curve (for those embodiments including a thermistor). Each curve may be established by measuring the output of the A-to-D converter at two known values (e.g., two known forces on the pedal or two known temperatures). Since the curves are typically straight line curves, two values are sufficient to determine the slope of the curve. For the power curve, an A-to-D value is compared with the power curve to determine the power being applied to the crank. To compensate for temperature, the A-to-D value of the thermistor is used to select an temperature offset value (or compensation value) from the temperature curve to apply to the power value.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A power measurement assembly comprising:
a crank arm defining a common outer surface between a pedal aperture and a bottom bracket aperture;
at least two strain gauges mounted on the common outer surface of the crank arm;
a housing affixed to the common outer surface of the crank arm and disposed entirely at a location between the pedal aperture and the bottom bracket aperture, the housing comprises a first portion configured to cover the at least two strain gauges, a second portion disposed above and substantially parallel with the common outer surface but not in contact with the common outer surface, a processor, and a circuit connected to the at least two strain gauges, the circuit configured to provide an output proportional to a force applied to the crank arm to the processor, the processor configured to compute a value indicative of power based on the output from the circuit.

2. The power measurement assembly of claim 1, further comprising: the crank arm defining a longitudinal centerline extending between the pedal aperture and the bottom bracket aperture on the common outer surface; wherein the at least two strain gauges comprising a first strain gauge and a second strain gauge, the first strain gauge being positioned on a first side of the longitudinal centerline and the second strain gauge being positioned on a second opposite side of the longitudinal centerline, the first and second strain gauges positioned substantially parallel to each other and equidistant from the longitudinal centerline on the common outer surface.

3. The power measurement assembly of claim 2, wherein the common outer surface is an inside wall of the crank arm, the inside wall facing a bicycle frame when the crank arm is operably mounted on the bicycle frame.

4. The power measurement assembly of claim 3, wherein the at least two strain gauges further comprising: a third strain gauge and a fourth strain gauge, the third strain gauge positioned adjacent to the first strain gauge and on the same side of the longitudinal centerline as the first strain gauge and the fourth strain gauge positioned adjacent to the second strain gauge and on the same side of the longitudinal centerline as the second strain gauge, wherein the circuit is a Wheatstone bridge circuit including the first strain gauge, the second strain gauge, the third strain gauge and the fourth strain gauge.

5. The power assembly of claim 4, wherein the first portion of the housing is a male portion that fits within a recess in the inside wall of the crank arm and the recess includes the first, second, third and fourth strain gauges.

6. The power assembly of claim 5, wherein the second portion of the housing is a cantilevered portion extending from the male portion along the inside wall of the crank arm, the cantilevered portion housing at least one battery providing power to the circuit, the processor and a wireless transmitter.

7. The power assembly of claim 1, further comprising at least one of a reed switch and an accelerometer coupled with the processor to produce a value indicative of crank revolutions used by the processor to determine the value indicative of power.

8. The power assembly of claim 1, further comprising an element providing a value indicative of temperature used by the processor to provide a temperature compensated value indicative of power.

9. The power measurement assembly of claim 1, wherein the at least two strain gauges are bonded directly on the common outer surface of the crank arm.

10. The power measurement assembly of claim 1, wherein the value indicative of power is a power value.

11. The power measurement assembly of claim 1, wherein the value indicative of power is a torque value.

12. A power measurement assembly comprising:
a first crank arm having a pedal aperture and a bottom bracket aperture, the crank arm comprising two or more strain gauges configured to react in response to a force applied to the first crank arm, the two or more strain gauges arranged in parallel to one another and mounted within a recess defined in the common wall of the first crank arm between the pedal aperture and the bottom bracket aperture; and
a housing mounted on the common wall of the first crank arm and positioned only between the pedal aperture and the bottom bracket aperture, the housing having a first portion and a second portion, the second portion being disposed above but not in contact with the common wall of the first crank arm, the housing including an element providing an output corresponding to revolutions of the first crank arm, a processor, a wireless transmitter and a circuit including the strain gauges, the circuit configured to provide an output to the processor as a function of the force applied to the first crank arm, the processor configured to use the output of the element and the circuit to calculate a power value and the wireless transmitter configured to transmit the power value.

13. The power measurement assembly of claim 12, wherein the first crank arm further including a longitudinal centerline extending between the pedal aperture and the bottom bracket aperture on the common wall and the two or more strain gauges including four strain gauges with a first strain gauge and a third strain gauge positioned adjacent to one another on a first side of the longitudinal centerline of the common wall, and a second strain gauge and a fourth strain gauge positioned adjacent to one another on a second opposite side of the longitudinal centerline of the common wall, wherein the common wall of the first crank arm is an inside wall of the first crank arm and is configured to face a second crank arm when assembled.

14. The power measurement assembly of claim 13, wherein power measurement only occurs on the first crank arm, wherein the power value is a function of substantially doubling the output of the circuit to the processor to approximate the power expended in pedaling using the first and second crank arms.

15. The power measurement assembly of claim 14, further comprising a thermistor in communication with the processor, the processor further configured to adjust the power value to compensate for temperature effects.

16. The power measurement assembly of claim 13, wherein the first portion of the housing is a male portion that fits within the recess in the common wall of the first crank arm and wherein the recess includes the first, second, third and fourth strain gauges.

17. The power measurement assembly of claim 16, wherein the male portion includes a gasket between the housing and the recess.

18. The power measurement assembly of claim 12, wherein the second portion of the housing includes a cantilevered portion extending from the male portion, the cantilevered portion housing at least one battery providing power to the circuit and the processor.

19. The power measurement assembly of claim 12, further comprising another element configured to provide an output indicative of temperature to the processor, the processor further configured to adjust the power value to compensate for temperature.

20. The power measurement assembly of claim 12, wherein the two or more strain gauges are bonded directly within the recess in the common wall of the first crank arm.

21. An exercise bicycle comprising:
a power measurement assembly including a first crank arm defining an inside wall between a pedal aperture and a bottom bracket aperture, the inside wall including a longitudinal centerline intersecting and extending between a first axis of the pedal aperture and a second axis of the bottom bracket aperture, the inside wall having a recess positioned relatively closer to the bottom bracket aperture than the pedal aperture, the recess including four strain gauges, two of the four strain gauges disposed on a first side of the longitudinal centerline and substantially equidistant from the longitudinal centerline, the other two of the four strain gauges disposed on an second opposing side of the longitudinal centerline and substantially equidistant from the longitudinal centerline, each of the four strain gauges positioned with same orientation and substantially parallel to the other strain gauges such that the two strain gauges on the first side of the longitudinal centerline will be in compression while the other two strain gauges on the second opposing side of the longitudinal centerline will be in tension when a force is applied at the pedal aperture; and
a housing mounted to the first crank arm at a location between the pedal aperture and the bottom bracket aperture, the housing including a mounted portion and a cantilevered portion, the mounted portion connected to the first crank arm at the recess and covering the four strain gauges, the cantilevered portion extending from the mounted portion along the longitudinal centerline toward the pedal aperture, the cantilevered portion disposed above and substantially parallel with the inside wall but not in contact with the inside wall, the housing further including a circuit board comprising a reed switch configured to provide a pulse during rotation of the crank arm, a Wheatstone bridge circuit including at least the four strain gauges, a processor and a wireless transmitter, wherein the Wheatstone bridge circuit configured to provide an output proportional to a force applied to the first crank arm to the processor, the processor configured to calculate a power value based on the output of the Wheatstone bridge circuit, and the wireless transmitter configured to receive and transmit the power value, and wherein the cantilevered portion houses at least one battery to provide power to the circuit board.

22. The exercise bicycle of claim 21, further comprising a display processor and an associated display that are configured to wirelessly receive the power value from the wireless transmitter, the power value being an instantaneous value that is averaged by the display processor.

23. The exercise bicycle of claim 22, further comprising a thermistor in communication with the processor, the processor further configured to adjust the power value to compensate for temperature effects, wherein the display shows a temperature compensated and doubled power value.

24. The exercise bicycle of claim 21, wherein the power value calculated by the processor is a function of doubling the output of the Wheatstone bridge circuit to the processor to approximate a power exerted by a user to the first crank arm and a second crank arm while riding the exercise bicycle.

* * * * *